Oct. 25, 1938.   C. O. CRESSY   2,134,104
LIQUID LEVEL INDICATING DEVICE
Filed April 21, 1936   2 Sheets-Sheet 1

Inventor:
Charles O. Cressy
By
Attorneys.

Oct. 25, 1938.   C. O. CRESSY   2,134,104
LIQUID LEVEL INDICATING DEVICE
Filed April 21, 1936   2 Sheets-Sheet 2
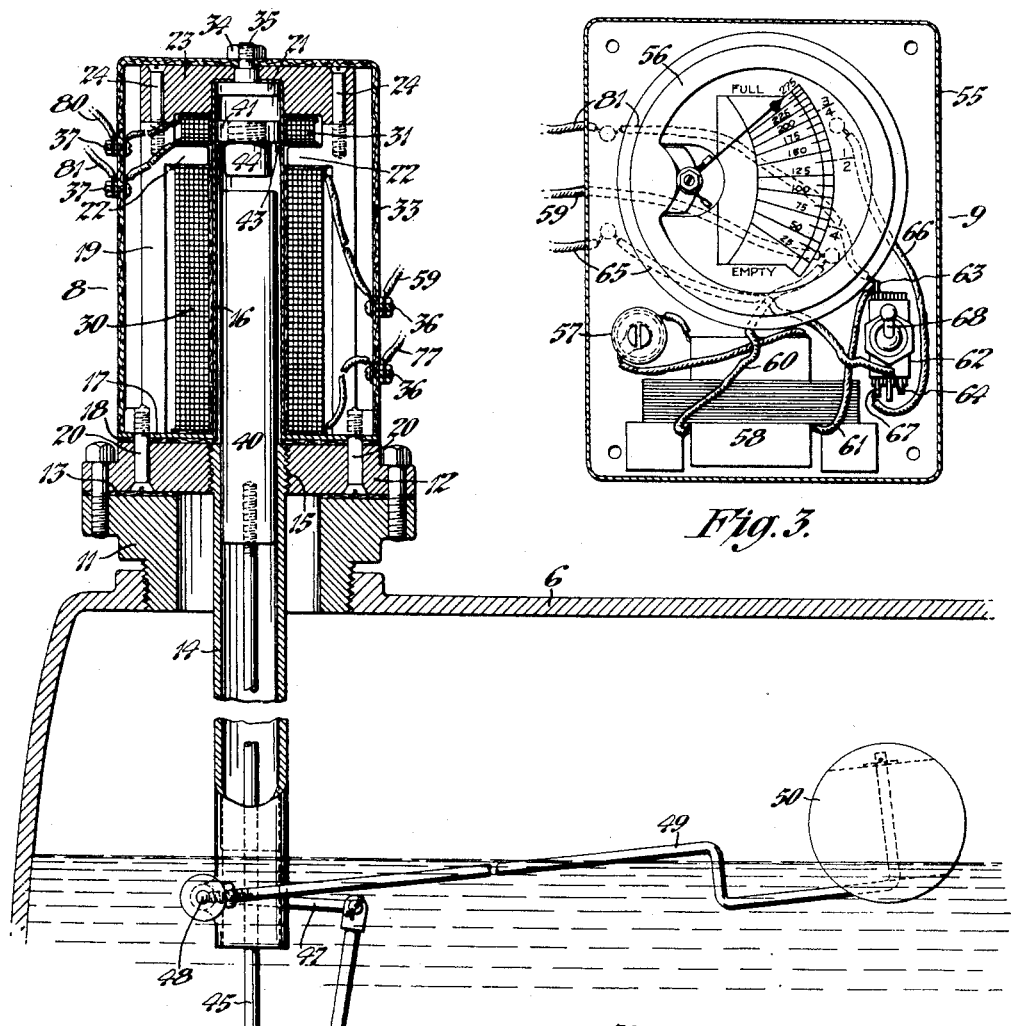
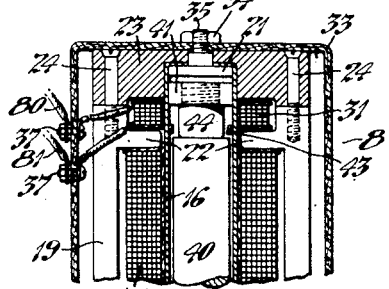
Inventor:
Charles O. Cressy
By
Attorneys.

Patented Oct. 25, 1938

2,134,104

UNITED STATES PATENT OFFICE 2,134,104

LIQUID LEVEL INDICATING DEVICE

Charles O. Cressy, Tiverton, R. I., assignor to Narragansett Products Corporation, Providence, R. I., a corporation of Rhode Island Application April 21, 1936, Serial No. 75,594

13 Claims. (Cl. 73—313)

This invention relates to electrical signaling systems and and particularly to apparatus for indicating the liquid level in containers such as oil tanks or the like.

The principal object of the present invention is to provide a system and apparatus of the type indicated including means for automatically indicating either a high or low level in the container and manually controlled means for measuring the quantity of liquid.

Another object of the invention is to provide a system and apparatus of the type indicated in which an electrical indicating circuit located wholly outside of the liquid container is controlled by hermetically sealed means within the container whereby to eliminate any possibility of fire hazard when the device is used with an inflammable material such as oil.

Another object of the invention is to provide a system and apparatus of the type indicated in which a hermetically sealed magnetic armature within the liquid container alters the reactance of a winding outside the container to vary the voltage and current flow in a circuit in accordance with the liquid level in the container without the use of switches or movable contacts.

Another object of the invention is to provide a system and apparatus of the type indicated including a control unit at the container and an indicating unit remote therefrom for indicating either a low level or the quantity of liquid in the container.

Another object of the invention is to provide a system and apparatus of the type indicated in which neon lamps located remotely from the container indicate a high and low level of the liquid and a manually-controlled meter gauges the quantity of liquid in the container.

Still another object of the invention is to provide an apparatus of the type indicated which is of simple and compact structure, economical to manufacture and assemble, and positive and accurate in indicating the liquid level in a tank.

Further objects of the invention are set forth in the following specification which describes a preferred form of construction thereof, by way of example, as illustrated by the accompanying drawings. In the drawings:

Fig. 2 is a side elevational view of the control unit in section showing the relationship of the hermetically sealed float-controlled armatures with respect to the reactance coils on the outside of the container;

Fig. 3 is a side elevational view of one of the indicating units with the casing illustrated as broken away to show the relation of the elements for selectively indicating a low level or the quantity of liquid in the container;

Fig. 4 is a detailed sectional view of the upper end of the control unit showing the auxiliary armature moved to a high level position by the float-actuated armature.

The invention relates generally to an electrical signaling system for oil tanks or the like and comprises a control unit including hermetically sealed magnetic armatures within the tank which vary the reactance in branch circuits outside the tank in accordance with the liquid level. A signaling unit located remotely with respect to the tank includes a meter and a neon lamp for indicating the quantity and low level of the liquid, respectively, being selectively connected in one of the branch circuits by a switch. The switch is normally spring-pressed to close the circuit through the neon lamp which is luminous at a critical voltage to automatically indicate a low level. A similar neon lamp in the other branch circuit constitutes a second signaling unit for indicating a high level condition of the liquid.

Figure 1:
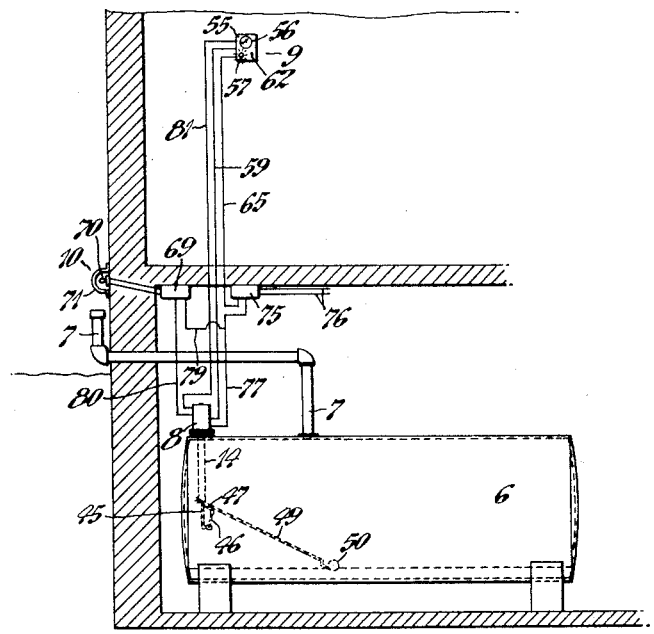
Fig. 1 is a view showing the relationship of the elements of the signaling system constituting the present invention.

Referring to Fig. 1 of the drawings, an oil tank 6 is illustrated as located in the cellar of a residence with a filling pipe 7 extending through the outside wall thereof. It will be understood, however, that the tank 6 or other container may take any form and contain any liquid other than oil, or be located elsewhere than in a residence. The control unit 8 is mounted on the tank 6 and electrically connected with signaling units 9 and 10 located remotely from the tank. As herein illustrated, the unit 9 is mounted on the kitchen wall of the residence and the unit 10 is located on the outside wall adjacent the filling pipe 7.

The control unit 8, illustrated in detail in Fig. 2, includes a nipple 11 adapted to be screwed into a suitable opening in the tank 6 to form a sealed joint. A plate 12 is bolted or otherwise secured to the top of the nipple 11 with a gasket 13 therebetween, the plate having a tapped hole 15 into which the upper end of the depending tube 14 is screwed. Another tube 16 of suitable impervious and nonmagnetic material projects upwardly from the plate 12 and has its lower end sealed to the top of the plate by a radially-extending skirt 17 and a gasket 18 positioned therebetween. To seal the joint the skirt 17 is held tightly clamped to the top face of the plate 12 by the base of an inverted U-shaped magnetic frame 19. The base of the frame 19 rests on the skirt 17 and is attached to the plate by means of screws 20. The upper end of the tube 16 is sealed by a plug 21 of magnetic material soldered, welded or otherwise secured to an inturned flange on the tube, and the plug has a threaded stud 35 projecting upwardly from the end of the tube. The upper and lower tubes 16 and 14 are thus hermetically sealed to the plate 12 and cooperate to form an air trap which prevents the liquid in the tank from entering the lower tube. Inwardly-directed shoulders 22 are provided on the opposite legs of the frame 19 and the upper ends of the legs are bridged by a separate plate 23 secured thereto by screws 24.

In accordance with the present invention a hollow reactance coil 30 is mounted on the tube 16 of the control unit 8 between the skirt 17 and inwardly-directed shoulders 22 on the magnetic frame 19. Above the reactance coil 30 and in axial alinement therewith is an auxiliary reactance coil 31 mounted between the shoulder 22 and the removable plate 23 of the frame 19. The upstanding parts of the control unit 8 are enclosed by a cylindrical cover 33 which seats against the outer edge of the skirt 17 of the tube 16. The cover 33 is secured in place by a nut 34 screwed down on the threaded stud 35 which extends upwardly from the plug 21 and through a hole in the top of the cover. Separate pairs of binding posts 36 and 37 are mounted on the cover 33 for connection with the opposite leads of the reactance coils 30 and 31 to facilitate the connection of the coils in their circuits. The reactance coils 30 and 31 for controlling the electrical circuit are thus positioned wholly outside of the impervious tube 16 and are hermetically sealed from the interior of the tank 6.

Magnetic armatures 40 and 41 are positioned wholly within the tube 16 and act to vary the reactance of the coils 30 and 31 as they are moved longitudinally of the tube. The armature 41 is of a magnetic material and of substantially the same diameter as the inside of the tube 16 in which it is guided. This armature 41 normally rests on an annular shoulder 43 in the tube 16 to support it centrally of the coil. Depending from the armature 41 is an actuating stud 44 of nonmagnetic material provided for a purpose to be later explained. The armature 40 is supported on the upper end of a push-rod 45 extending longitudinally of the tube 14 and projecting below its lower end. The lower end of the push-rod 45 is linked to a connecting rod 46 which is pivotally connected to a crank-arm 47 at its opposite end. The crank-arm 47 is carried by a shaft 48 journaled in a suitable bearing at the lower end of the tube 14 to adapt it to be rocked by a float-rod 49. A float 50 is attached to the extended end of the float-rod 49 and through the connecting linkage acts to raise and lower the armature 40 to vary the reactance of the coil 30 in accordance with the level of the liquid in the tank 6.

The indicating unit 9 located remotely with respect to the control unit 8 is enclosed within a box-like housing 55 adapted to be secured to a wall or the like by any suitable means. As illustrated in Fig. 3, the indicating unit includes an ammeter 56, calibrated to indicate gallons or other quantitative units of the liquid in the tank, and a lamp 57 for indicating a low level of the liquid. The lamp 57 may be of any type adapted to flash on or off at a critical voltage, as characteristic of glow lamps, and preferably a neon glow lamp is used. A step-up transformer 58 is mounted in the housing 55 for supplying current to the neon lamp 57 at a relatively high voltage with respect to the voltage of the circuit. As herein illustrated, the primary winding of the transformer 58 is connected in series with a line conductor 59 from the reactance coil 30 and one terminal 63 of a switch 62 through flexible leads 60 and 61; and the neon lamp 57 is connected in series with the secondary winding of the transformer. The circuit is completed through the switch 62 and a return conductor 65 connected to another terminal 64 of the switch. The ammeter 56 is connected in shunt with the primary winding of the transformer 58 through the conductor 59 connected to one terminal of the meter and a lead 66 connected between the other terminal of the meter 56 and a third terminal 67 of the switch 62. The switch 62 is normally spring-pressed to maintain a closed circuit through the primary winding of the transformer 58 while maintaining the shunt circuit through the meter 56 open. However, the switch-arm 68 of the switch 62 may be manually actuated to complete the circuit through the meter 56 to indicate the quantity of liquid in the tank, the circuit through the primary winding of the transformer 58 being simultaneously opened.

Figure 5:
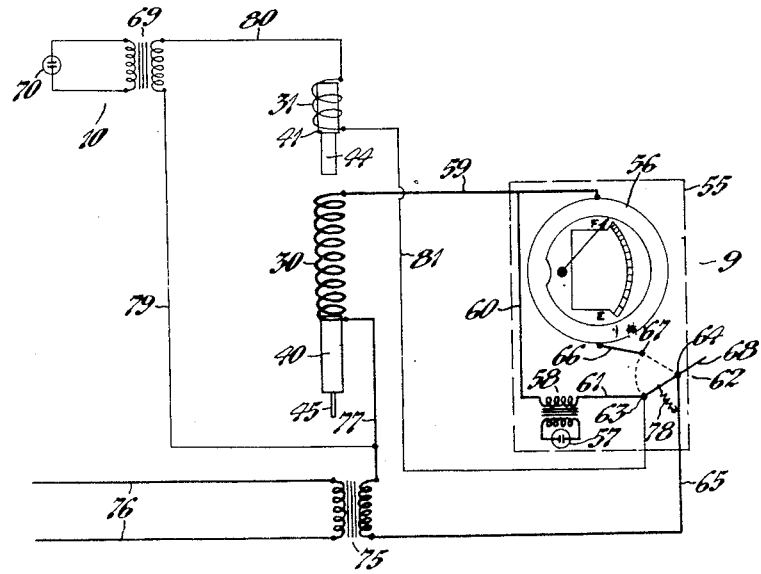
Fig. 5 is a diagrammatical view of the electric circuit of the indicating system.

The other signaling unit 10, illustrated in Figs. 1 and 5, is located remotely from the control unit 8 and preferably adjacent the end of the filling pipe 7 on the outside wall of the house. This indicating unit comprises a step-up transformer 69, similar to the transformer 58, having a lamp 70 in circuit with its secondary winding. The lamp 70 is preferably a neon glow-lamp which is luminous at a critical voltage to automatically indicate to an attendant supplying the tank when the latter has become full. The lamp 70 is preferably enclosed in a protective housing to prevent breakage or tampering by mischievous persons. The housing may take the form of the translucent shield 71 when applied to old constructions or the housing may be built into the wall in new constructions.

The electrical circuit for the signaling system of the present invention is diagrammatically illustrated in Figs. 1 and 5 and includes a step-down transformer 75 for supplying low voltage current from a service main 76. In one embodiment, the transformer 75 reduces the line voltage from 110 to 8 volts and the step-up transformers 58 and 69 are preferably designed to operate the neon lamps 57 and 70 at 75 volts whereby standard types of neon lamps may be used. It is to be understood, however, that the ratio of the reactance coils 30 and 31 and the windings of the transformers 58, 69 and 75 may be designed to operate the system under any desired conditions. In series with the secondary winding of the transformer 75 are the low-level and high-level branch circuits connected in parallel. The low-level circuit includes the reactance coil 30 and signaling unit 9 connected in series with the secondary of the transformer 75 by the conductors 77, 59 and 65. As explained above the circuit is normally completed by the lead 60 through the primary of the transformer 58, the switch 62 and return conductor 65. The switch-arm 68 is normally held in the position shown in Fig. 5 by a suitable spring 78 but may be manually actuated to close the circuit through the meter 56 and open the circuit through the primary of the transformer 58.

The high-level branch of the circuit includes the primary of the transformer 69 and reactance coil 31 connected in series between the secondary of the power transformer 75 and the terminal 63 of the switch 62. As herein illustrated, a conductor 79 is connected between the line conductor 77 adjacent the transformer 75 and the primary winding of the transformer 69, while conductors 80 and 81 are connected between the transformer winding and reactance coil 31 and the reactance coil and switch 62 respectively. The circuit is completed through the switch-arm 68 and return conductor 65 to the other side of the power transformer 75. The apparatus and electrical circuit of the indicating system having now been described in detail its mode of operation will be next explained.

The control unit 8 is mounted on the tank 6 in the manner previously explained, the indicating units 9 and 10 mounted in their respective remote locations and the several units electrically connected in circuit as indicated in Fig. 5. When the float 50 is in the position indicated in Fig. 1, the armature 40 is at its lowest position or withdrawn from the reactance coil 30 while the armature 41 is supported by the shoulder 43 in the tube 16 centrally positioned within the coil 31. The reactance and voltage drop across the coil 30 is then at a minimum permitting a maximum current flow in the low-level branch of the circuit; while the reactance and voltage drop across the coil 31 is at a maximum permitting a minimum current flow in the high-level branch of the circuit. Due to the design of the reactance coil 30 and the primary winding of the transformer 58 the induced voltage in the secondary circuit is above the critical voltage at which the neon lamp 57 becomes luminous to indicate a low level in the tank. By manually rocking the switch-arm 68 the circuit through the neon lamp 57 is opened and the circuit completed through the ammeter 56. As the voltage drop across the reactance coil 30 is directly dependent upon the position of the magnetic armature 40 which, in turn, is controlled in accordance with the level of the liquid by the float 50, the current in the circuit varies inversely with the level in the tank. The ammeter 56, being calibrated to indicate the quantity of liquid, will then give an indication of the actual quantity of oil or other liquid still remaining in the tank. As the circuit through the transformer 58 is opened when the switch-arm 68 is rocked to the dotted line position illustrated in Fig. 5, the reading on the meter will not be affected by any reactance in the circuit other than that caused by the coil 30.

When a supply of oil is introduced through the filling pipe 7 the float 50 is raised as the oil level rises and acts through the float-rod 49, crank-arm 47, connecting rod 46 and push-rod 45 to proportionately raise the magnetic armature 40 in the tube 16 with a reduced motion. The reactance and voltage drop across the coil 30 is thus varied directly in proportion to the level of the oil or other fluid in the tank. When the float 50 rises above a predetermined low level the neon lamp 57 is extinguished due to the critical voltage necessary to maintain it luminous, so that the neon lamp acts to positively indicate a low level condition requiring no interpolation by an observer. The filling of the tank is continued until the armature 40 engages the nonmagnetic stud 44 depending from the armature 41. Further upward movement of the armature 40 causes the armature 41 to be moved out of its central position within the reactance coil 31 as illustrated in Fig. 4, thereby decreasing the reactance of the coil 31. The decrease in the reactance causes an increase in the current flow in the high-level branch of the circuit which is completed through the conductor wire 79, the primary winding of the transformer 69, conductor 80, the reactance coil 31, conductor 81, switch 62 and return conductor 65. The design of the elements of the high-level branch of the circuit is such that the induced voltage in the secondary winding of the transformer 69 is increased above a critical value which causes the neon lamp 70 located adjacent the filling pipe 7 to become luminous to indicate to the attendant that the tank is full. In this way overflow from the tank is prevented. With the tank full the magnetic armature 40 is positioned wholly within the reactance coil 30 which increases the reactance to a maximum and decreases the current flow in the low-level circuit to a minimum. The neon lamp 57 is thus nonluminous and by tilting the switch-arm 68 the meter 56 will indicate a full tank.

As the oil or other liquid is removed from the tank the level is lowered which, in turn, lowers the armatures 40 and 41 until the reactance of the coil 31 is at a maximum causing the neon lamp 70 to be extinguished. As the level of the liquid in the tank continues to fall the armature 40 is withdrawn from the coil 30 which decreases the reactance of the coil 30 directly in proportion to the level of the liquid. The neon lamp 57 in the indicating unit 9 remains nonluminous during the lowering of the level in the tank until a predetermined low level has been reached and at any time the switch-arm 68 may be manually actuated to indicate the quantity of liquid in the tank due to the particular current flow resulting from the reactance of the coil 30. When the level in the tank 6 approaches a minimum, as indicated in Fig. 1, the induced voltage in the secondary winding of the low-level circuit transformer 58 has so increased as to render the neon lamp 57 luminous as a warning that a new supply of liquid is needed.

The system and apparatus of the present invention continue to operate in the manner explained above for indefinite periods of time and with a very small current consumption due to the low voltage and high reactance of the circuits. Should any part of the operating mechanism become loose or broken the armature 40 will fall and operate the low level neon lamp and thereby call attention to the fault. Further, the apparatus operates without danger of fire hazard due to the elimination of switches and contacts adjacent the tank and the hermetical seal between the reactance coils outside the tank and the magnetic armatures within the tank.

It will now be observed that my invention provides an ingenious signaling system for indicating a high or low level of the liquid or the quantity of liquid in a tank or other container at a location remote therefrom. Still further, it will be observed that a simple and compact form of apparatus is provided which is positive and efficient in accurately indicating the level of the liquid in the container.

While I have herein described and illustrated one preferred embodiment of the invention, it is to be understood that various modifications may be made in the form and arrangement of the elements thereof within the spirit and scope of the present invention. Therefore, without limiting myself in this respect, I claim:

1. A liquid level indicating system for tanks comprising a tank, an electrical circuit including a reactance coil, a magnetic armature movable relatively of the coil, a float in the tank operatively connected to the armature for operating the latter to vary the reactance of the coil in accordance with the level of the liquid in the tank to vary the voltage and current flow in the circuit, a vapor lamp in the circuit adapted to flash from a nonluminous to a fully luminous condition at a critical voltage to positively indicate a predetermined low level of the liquid, a meter in shunt with the lamp and calibrated to indicate the quantity of liquid, and a selective switch for connecting either the meter or the lamp in the circuit.

2. A liquid level indicating system for tanks comprising a tank, an electrical circuit including a reactance coil, a magnetic armature movable relatively of the coil, a float in the tank operatively connected to the armature for operating the latter to vary the reactance of the coil in accordance with variations in the level of the liquid in the tank to vary the voltage and current flow in the circuit, a neon lamp in the circuit responsive at a critical voltage to indicate a low level of the liquid, a meter in shunt with the neon lamp and calibrated to indicate the quantity of liquid in the tank, and a spring-pressed switch normally closing the circuit through the neon lamp while maintaining the shunt circuit open, said switch being manually operable to close the shunt circuit through the meter and open the circuit through the lamp.

3. A liquid level indicating system for oil tanks comprising a tank, an electrical circuit including a hollow reactance coil, a magnetic armature movable into and out of the coil, a float in the tank operatively connected to the armature for operating the latter to vary the reactance of the coil in accordance with variations in the level of the oil in the tank to vary the voltage and current flow in the circuit, a transformer having its primary winding in the circuit, a neon lamp in the secondary circuit of the transformer and responsive at a critical voltage to indicate a low level in the tank, a meter in shunt with the primary of the transformer and calibrated to indicate the quantity of oil in the tank, said neon lamp and meter being located remotely of the tank, and a spring-pressed switch for normally closing the circuit through the neon lamp while maintaining the shunt circuit open, said switch being manually operable to close the shunt circuit through the meter and open the circuit through the neon lamp.

4. A liquid level indicating system for tanks comprising a tank, an electrical circuit including parallel branches, a reactance coil in each of the branches of the circuit, means for varying the reactance of each coil to alter the voltage in each branch of the circuit, means for operating the reactance varying means of the coils automatically in response to variations in the liquid level in the tank, and a vapor lamp in each branch of the circuit luminous only at a particular voltage to indicate a high or low level of the liquid.

5. A liquid level indicating system for tanks comprising a tank, an electrical circuit including parallel branches, a reactance coil in each of the branches of the circuit, armatures for varying the reactance of each coil to alter the voltage and current flow in each branch of the circuit, a common means for operating the armatures in accordance with variations in the level of the liquid in the tank, a vapor lamp in one of the branches luminous only at a particular voltage, said armatures and operating means being so constructed and arranged as to cause the lamp to be illuminated to indicate a predetermined high level of the liquid, and a meter in the other branch calibrated to indicate the quantity of liquid in the tank.

6. A liquid level indicating system for tanks comprising a tank, an electrical circuit including parallel branches, a reactance coil in each of the branches of the circuit, armatures for varying the reactance of each coil to alter the voltage and current flow in each branch of the circuit, a common means for operating the armatures in acordance with variations in the level of the liquid in the tank, said armature and operating means being so constructed and arranged as to vary the reactance of the coils inversely as the armatures are moved in either direction, a neon lamp in one of the branches critical at a particular voltage to indicate a high level of the liquid, and a neon lamp in the other branch of the circuit and critical at a particular voltage to indicate a low level of the liquid.

7. A liquid level indicating system for oil tanks comprising a tank, an electrical circuit including parallel branches, a reactance coil in each of the branches of the circuit, armatures for varying the reactance of each coil inversely as they are moved in either direction to alter the voltage and current flow in each branch of the circuit, means for operating the armatures in accordance with variations in the level of the liquid in the tank, a neon lamp in one of the branches critical at a particular voltage to indicate a high level of the oil, a neon lamp in the other branch of the circuit and critical at a particular voltage to indicate a low level of the oil, a meter connected in shunt with the low level neon lamp and calibrated to indicate the quantity of oil in the tank, and a spring-pressed switch for normally closing the circuit through the neon lamps while maintaining the shunt circuit open, said switch being manually operable to close the shunt circuit through the meter and open the circuits through the lamps.

8. A liquid level indicating system for tanks comprising a tank, an electrical circuit having parallel branches for indicating a high and low level of the liquid, each branch of the circuit including a hollow reactance coil and a neon lamp, said reactance coils being arranged in axial alinement, a magnetic armature for each of the reactance coils, and a float operatively connected to one of the armatures to vary the reactance and voltage in one of the branch circuits automatically in response to variations in the level of the liquid in the tank, said actuated armature engaging the other armature to move it out of its coil at a high level of the liquid in the tank and said neon lamps in the branch circuits being responsive at a critical voltage to indicate a low level when the float-operated armature is withdrawn and a high level when the other armature is raised.

9. In a liquid level indicating system for oil tanks, a main circuit including a hollow reactance coil, a magnetic armature movable into and out of the coil to vary its reactance and the voltage and current flow in the circuit automatically in response to variations in the level of the oil in the tank, a float operatively connected to the armature to actuate the latter, a neon lamp in the circuit, a meter in shunt with the neon lamp and calibrated to indicate the quantity of oil in the tank, a spring-pressed switch for normally closing the circuit through the neon lamp while maintaining the shunt circuit open, said neon lamp being responsive at a critical voltage to indicate a low level of the oil when the armature is withdrawn from the coil, an auxiliary circuit in parallel with the main circuit including a hollow reactance coil, an armature for the coil, and a neon lamp in the circuit, said armature being engaged and raised by the float-operated armature to increase the voltage and to thereby illuminate the neon lamp to indicate a high level of the oil.

10. In a float-control unit for a signaling system, a tank for containing a supply of liquid, a closure-plate adapted to be applied to close an opening in the tank, a tube extending upwardly from the plate with its end sealed to form a hermetically sealed closure, a reactance coil surrounding the tube, a magnetic armature within the tube, a float connected to the armature to move the latter with respect to the reactance coil automatically in response to variations in the level of the liquid in the tank, and a tube sealed to the closure-plate and extending downwardly therefrom to form an air trap to prevent the liquid from entering the tube.

11. In a float-control unit for a signalling system, a tank for containing a supply of liquid, a nipple for closing an opening in the tank having a closure-plate, tubular members extending above and below the plate with the upper end sealed, a reactance coil surrounding the upper end of the tube, a magnetic armature for the coil having a push-rod depending therefrom, a shoulder within said tube for normally supporting the armature centrally of the coil, a second reactance coil surrounding the tube, a magnetic armature in the tube for said second coil, and a float connected to the second-mentioned armature and so constructed and arranged as to move the latter longitudinally of the tube automatically in response to variations in the level of the liquid in the tank, said second-mentioned armature engaging the depending push-rod on the first-mentioned armature as the tank becomes filled to move it out of the first-mentioned reactance coil.

12. A remote controlled unit for indicating the liquid level in a tank comprising a box having means for connection in a circuit, a meter in said box, a neon lamp in the box, and a selective switch in said box for connecting either the meter or neon lamp in circuit.

13. A remote controlled unit for indicating the liquid level in a tank comprising a box having binding posts for connection in a circuit, a meter in said box, a neon lamp in said box, said meter and lamp being connected in parallel, and a spring-pressed switch for normally closing the circuit through the neon lamp, said switch being manually operated to open the circuit through the neon lamp and close the circuit through the meter.

CHARLES O. CRESSY.